E. H. TRACY.
COMBINATION CARPENTER'S AND SURVEYOR'S LEVEL.
APPLICATION FILED MAR. 29, 1913.
1,145,098.
Patented July 6, 1915.
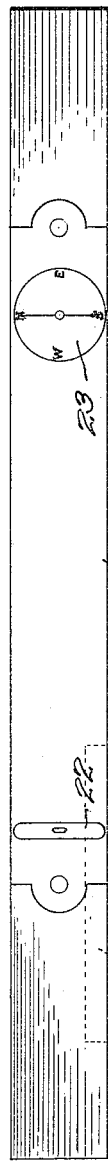
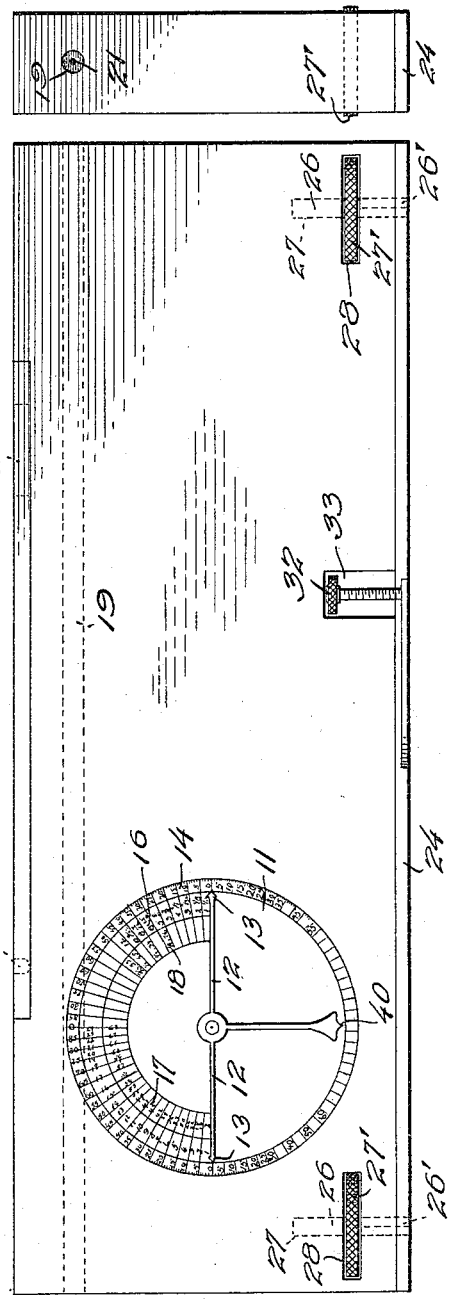
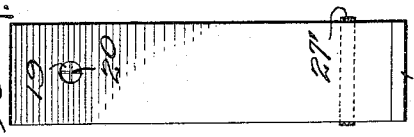
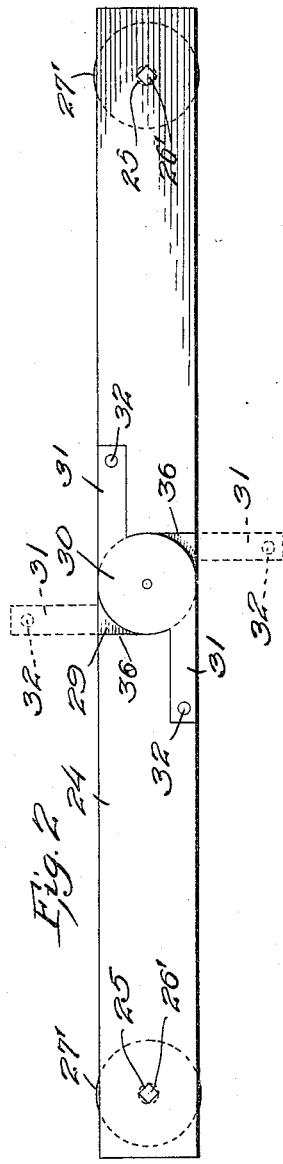
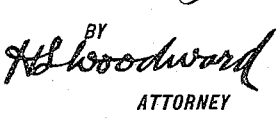
WITNESSES:
INVENTOR
E. H. Tracy,
BY
H. S. Woodward
ATTORNEY

UNITED STATES PATENT OFFICE.

EUGENE H. TRACY, OF CASS LAKE, MINNESOTA.

COMBINATION CARPENTER'S AND SURVEYOR'S LEVEL.

1,145,098. Specification of Letters Patent. Patented July 6, 1915.

Application filed March 29, 1913. Serial No. 757,621.

*To all whom it may concern:*

Be it known that I, EUGENE H. TRACY, a citizen of the United States, residing at Cass Lake, in the county of Cass and State of Minnesota, have invented new and useful Improvements in Combination Carpenters' and Surveyors' Levels, of which the following is a specification.

This invention relates to levels, and has for its object to provide a level adapted to serve as a combined carpenters' and surveyors' level especially adapted to use in grading or indicating the degree of inclination of various objects.

Another object is to provide a simple and efficient means adapted to be incorporated in the ordinary carpenter's level for leveling the device or for adjusting it in various planes, on surfaces having an angular relation to the plane in which it is desired to adjust the device, obviating the necessity for a special support.

Additional objects and advantages will appear, some of which will be apparent from the following description and from the drawings, in which, Figure 1 is a side view of the device, Fig. 2 is a bottom view thereof, Fig. 3 is a top view thereof, Fig. 4 is a front end view, Fig. 5, is a rear end view of the device.

There is illustrated a carpenter's level of familiar form, comprising a block 10 of suitable wood in the form of a parallelepiped. On one side there is pivoted a pendulum indicator 11, having a cross arm 12 with pointers 13 at each end, a suitable annular scale 14 being formed on the side of the block concentrically with the pivot, there being two zero points on the scale, on a line parallel with the top and bottom of the block; also figures adjacent the scale indicating degrees from each zero to 90 at top and bottom. Within the annular scale at the upper side, there is formed a series of figures 16 indicating the number of inches rise to the foot when the adjacent pointer indicates the degree of inclination corresponding to respective numbers 17 arranged adjacent and inwardly of those 16. At the right hand side, a scale 18 is formed indicating the angles of standard pitches for rafters which will be readily understood by those versed in building construction. Thus, when the level is set upon a rafter with the left hand end of the level toward the upper end of the rafter, the cross arm 12 will indicate on the scale the pitch or inclination of the rafter. Formed longitudinally through the body of the level adjacent and parallel to the upper side, there is a bore 19, at one end of which are mounted the customary crossed wires 20 and at the opposite end a small sight opening 21 is formed, the use of which will be readily understood by those acquainted with such devices. In the top face of the level there is mounted a small spirit level 22 disposed transversely of the block 10, parallel to the plane of the top, and a small compass 23 may also be mounted on the top of the block as shown. Secured on the bottom face of the level there is a plate 24, extending throughout the length of the level having openings 25 adjacent each end in which there are fitted slidably the lower rectangular tenoned end portions 26' of screws 26 each having its lower end flush with the lower face of the plate, and its other end projected into a recess 27 in the adjacent end of the block 10, a knurled nut 27' being threaded upon the upper end portion of each screw 26, the nut being of sufficient diameter to project through the front and back faces of the block, through suitable slots 28 formed for that purpose. The plate 24 is recessed at its central portion as at 29, to receive for pivotal movement a transverse-leveling plate 30 set flush with the bottom of the level. The plate includes two oppositely extending arms 31, of less width than the bottom face of the level and offset to lie at times disposed longitudinally of, and adjacent respective sides of, the level, with the outer edges of the arms flush with the lateral faces of the block 10. Each arm 31 is provided with a vertical leveling screw 32 threaded in the arm and contained in a recess 33 in the respective adjacent face of the block 10, the recess being open on the side of the block to permit the screw to move laterally therefrom under pivotal movement of the plate 30. This plate is provided with a circular central part and is adapted for movement to present the arms 31 at right angles to the medial longitudinal vertical plane of the block 10, the arms striking shoulders 36 at the sides of the recess 29, whereby the arms are checked in proper position. Spirit levels required in carpenters' levels of this type ordinarily may be dispensed with, and the lower pointer 40 on the pendulum 11 used to indicate the variations of surfaces from a vertical plane when the bottom of the block 10 is presented against such surfaces, while the pointers 13 will indicate the variations from a horizontal plane.

It is obvious that the device as a carpenter's level may be used for all the customary purposes of such appliances and in addition the pendulum indicator will also indicate in degrees the proper inclination of various timbers, such as rafters, braces, etc. When the device is to be set up for sighting, a suitable surface as nearly level as possible is selected, and the level set thereon with the plate 30 at the under side and extended as dotted in Fig. 2. The screws are projected a distance by means of the nuts 27' and by means of the screws 32 the device is then adjusted until the level 22 indicates the accurate transverse leveling of the appliance, after which the nuts 27' are manipulated to bring the sight 19 into level position, or such inclination as desired, the indicator 11 serving to show when the appliance is properly adjusted in this respect.

What is claimed:

A device comprising in combination a body having leveling devices, screw members mounted adjacent each end of the body adapted to be projected through its lower edge for the purposes described, a plate pivoted centrally of the lower edge of the body and provided with oppositely extended arms, for projection on opposite sides of the body at times, the lower edge being recessed to receive said plate and arms flush with adjacent surfaces at times, screw members threaded through the respective arms adjacent their outer ends and adapted to lie flush with the lower sides of the arms normally and having heads for operation to project the screws downwardly at times, the body being recessed at opposite sides to receive the screws when the plate is in closed position.

In testimony whereof I have hereunto set my hand in presence of two subscribing witnesses.

EUGENE H. TRACY.

Witnesses:
W. J. HOLE,
J. T. GARDNER.

Copies of this patent may be obtained for five cents each, by addressing the "Commissioner of Patents, Washington, D. C."